Jan. 5, 1937.  H. P. LUHN  2,066,411
METHOD AND APPARATUS FOR DETERMINING THREAD THICKNESS
Filed Feb. 19, 1935
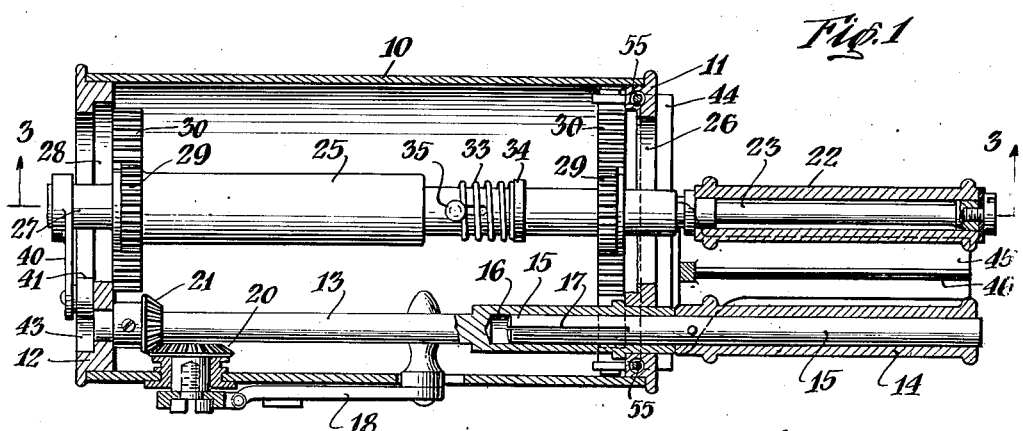
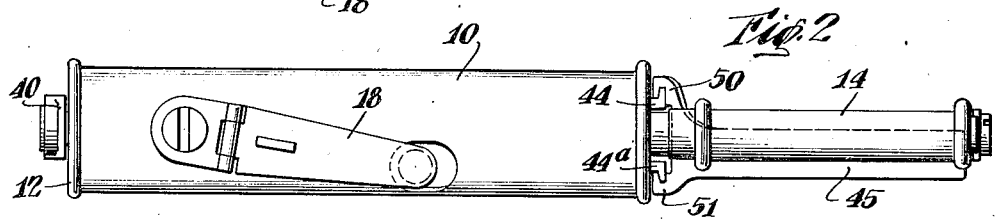
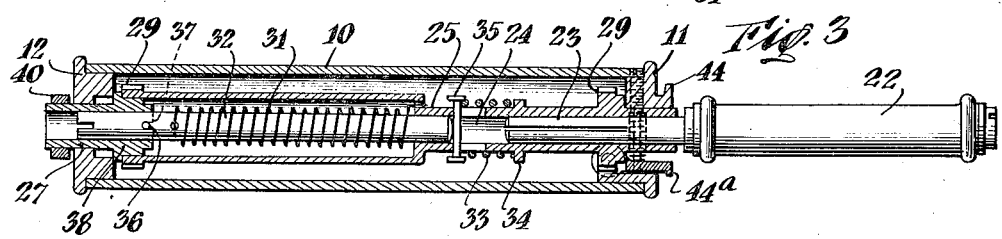
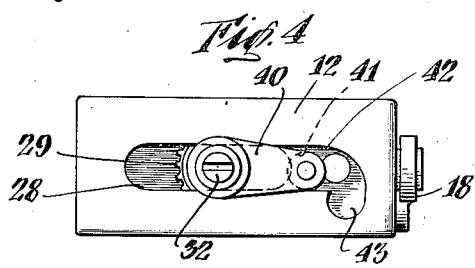
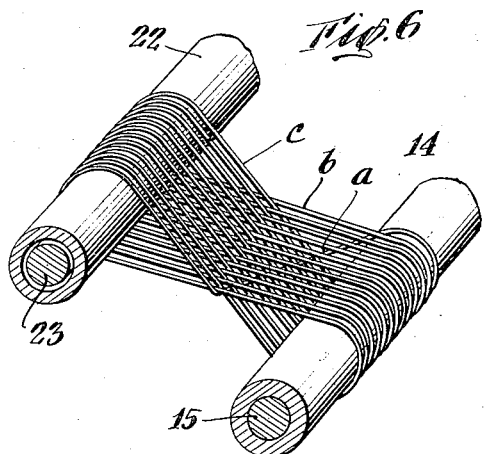
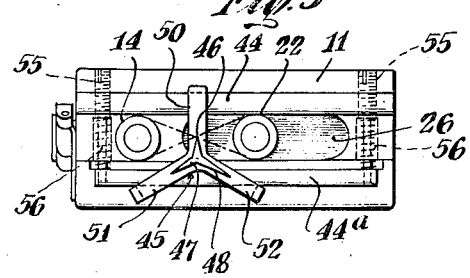
INVENTOR
Hans P. Luhn
BY
Hoguet, Neary & Campbell
ATTORNEYS Patented Jan. 5, 1937

2,066,411

UNITED STATES PATENT OFFICE 2,066,411

METHOD AND APPARATUS FOR DETERMINING THREAD THICKNESS

Hans P. Luhn, New York, N. Y.

Application February 19, 1935, Serial No. 7,303

18 Claims. (Cl. 33—125)

This invention relates to a method and apparatus for determining the thickness of thread.

In the textile industries it is often desirable to determine the thickness of thread quickly and accurately. The use of a micrometer does not afford reliable results because of the unavoidable deformation of the cross section of the thread due to the pressure applied by the micrometer because of its inherent construction and mode of operation. It also appears to be impractical, if not impossible, to construct a micrometer for properly supporting thread and at the same time apply a pressure to the thread in the operation of the micrometer which is neither too great to deform the thread nor so small as not to produce readings that are unrelated to the actual thickness of the thread. Optical methods are also unsatisfactory as the apparent visual thickness of thread is not necessarily identical with its actual physical thickness. Laboratory methods are likewise unsuitable because they are too complicated and slow to permit accurate results to be obtained quickly.

One object of the present invention is to provide a method and apparatus for quickly and accurately determining the thickness of thread.

A second object is to provide apparatus for determining the thickness of thread which is simple and rugged in construction and reliable in operation.

Other objects and advantages of the invention will become apparent upon consideration of the following description and appended claims when read in conjunction with the accompanying drawing, in which Figure 1 is a plan view of a thread testing apparatus embodying the invention, with one wall of the supporting casing removed and some parts shown in section to illustrate details of construction;

Figure 2 is a side view of the apparatus;

Figure 3 is a sectional view taken along the line 3—3 in Figure 1;

Figure 4 is an end view of the apparatus as viewed from the left hand side of Figure 2;

Figure 5 is an end view of the apparatus viewed from the right hand side of Figure 2;

Figure 6 is a fragmentary perspective view showing the use of the apparatus.

Referring to the drawing, the numeral 10 designates a rectangular casing in the end walls 11, 12 of which there is journalled a rotatable shaft 13. A roller 14 is fixed to a spindle 15 detachably engageable in a bore 16 at one end of shaft 13, the spindle being longitudinally split adjacent its end, as indicated at 17, for frictionally connecting roller 14 to shaft 13. Shaft 13, and hence roller 14, are rotatable by means of a crank 18 adapted to drive a bevel gear 20 meshing with a bevel gear 21 fixed to shaft 13.

An idler roller 22 is rotatably mounted on a spindle 23 detachably engageable in the bore 24 of a hollow shaft 25 that is guided for sliding movement laterally of casing 10 to move roller 22 away from and toward roller 14. At one end shaft 25 extends through and is guided in a slot 26 in the end wall 11. Adjacent its other end shaft 25 is enlarged and rotatably mounted on a sleeve 27 (Figure 3) extending through and guided in a slot 28 in the end wall 12. Shaft 25 is provided with gears 29 engaging toothed racks 30 supported in casing 10 for maintaining the axis of roller 22 parallel with that of roller 14 as the shaft 25 is moved laterally of the casing.

A tension spring 31 connected at opposite ends to a spindle 32 and to shaft 25 tends to turn the latter counter-clockwise and move it along racks 30 in a direction for moving roller 22 away from roller 14. Spindle 32 is supported adjacent its ends in the bores of shaft 25 and sleeve 27. A spring 33 bearing against a collar 34 on shaft 25 acts on a pin 35 extending through the shaft and engaging one end of spindle 32 to normally maintain a pin 36 on the latter engaging with a notch or notches 37 in the hub 38 of sleeve 27. An arm 40 fixed to the outward end of sleeve 27 is provided with a stud 41 (Figures 1 and 4) engaging the upper wall of slot 28 for holding sleeve 27 and spring spindle 32 against rotation with shaft 25, although both partake of the lateral sliding movements thereof. The end wall 12 is formed with a recess 42 (Figure 4) extending beyond one end of slot 28 and forming a continuation thereof. Recess 42 has an offset portion 43 in which the stud 41 on arm 40 may be engaged to hold roller 22 positioned adjacent roller 14.

As shown in Figure 5, the end wall 11 is provided with a pair of spaced guide rails 44 for slidably supporting a detachable measuring member 45. The member 45 consists of three equi-angularly disposed measuring scales 46, 47, 48 extending centrally from a base having three similarly disposed arms 50, 51, 52 of equal length. These arms are formed at their outer ends to engage the guide rails 44 for slidably mounting the measuring member in any one of three rotative positions in each one of which the scales extend outwardly from end wall 11 between the parallel to the rollers 14, 22.

The measuring scales 46, 47, 48 are of different heights so that their longitudinal edges may extend between and parallel to the rollers 14, 22 at three different levels with respect to the plane of the axes of the rollers depending upon the rotative position in which the measuring member 45 is mounted on the guide rails 44. Several scales of different heights are provided for properly supporting threads of different thicknesses since if threads being measured at different times vary materially in thickness, the outer surfaces of the threads at the intersecting point of the interlaced portions will be located at different levels with reference to the plane of the axes of rollers 14, 22.

The thickness of thread is determined with the above described apparatus in the following manner: a piece of determined length, two to three yards for example, is cut from the thread to be tested and its ends tied together to form a continuous loop. The roller 22 is moved to a position adjacent roller 14 and may be held in such position by engaging the stud 41 on arm 40 in the offset portion 43 of the recess 42.

The thread loop is wound on the rollers in a number of figure eight turns, as illustrated in Figures 5 and 6, so that portions of the thread extend partially around one roller and from the top thereof to the bottom of the other roller, partially around the latter to the top thereof and thence to the bottom of the first roller, the thread when tied to form a continuous piece extending from the last turn back to the beginning of the first turn, as indicated at *a* in Figure 6. With this arrangement the portions *b* of the thread that extend from the top of one roller to the bottom of the second cross and are interlaced with adjacent portions *c* extending from the top of the second roller to the bottom of the first in such a manner as to produce an automatic readjustment of the thread loop on the rollers during operation of the apparatus as described later.

To obtain a reliable indication of thread thickness it is necessary to line up the thread portions because it is practically impossible to wind thread by hand on rollers or other supports so that the thread is distributed evenly and under equal tension and diametral compression. Winding the thread on the rollers by hand causes some of the portions thereof that extend between the rollers to be disposed so that they lie parallel to each other and normally to the axes of the rollers while other thread portions extend between the rollers at various angles with respect to their axes. Furthermore, in distributing the thread on the rollers by hand some of the thread portions will be more tightly applied than others, with the result that the tension on different portions will vary. Moreover, some of the thread portions will be crowded against adjacent portions, causing the latter portions to be compressed diametrically to varying degrees while other portions may be spaced sufficiently so that such a compressive force is not applied thereto. Because of these conditions it would be impossible to accurately determine the thread thickness by simply measuring the width of a thread panel, formed by carefully trying to lay thread portions in side-by-side relation, and dividing by the number of thread turns on the rollers.

However, in accordance with the present invention it is not necessary to even attempt to wind the thread evenly and in parallelly-extending portions between the rollers, because the figure eight winding causes the threads to be properly rearranged in the operation of the apparatus regardless of whether or not the thread was carefully wound or even if a number of portions are wound over or across other portions.

When all of the thread loops have been wound upon the rollers the measuring member 45 is mounted on the guide rails 44 between the rollers 14, 22 so that the longitudinal edge of one of the scales, as 46, lightly supports the thread panel, as shown in Figure 5, at the intersection of the crossing thread portions to facilitate their readjustment.

To permit the scale member 45 to be mounted on the wall 11 when thread is disposed on rollers 14, 22 and the latter are connected to the casing, one of the rails 44, designated 44a, is resiliently mounted. Rail 44a is held in place by pins 55 and springs 56 are provided to maintain the rail in proper spaced relation to rail 44. By moving rail 44a against the force of springs 56, the hooks at the ends of one of the scale arms 50, 51, 52 may be engaged with rail 44 while the hooks of the other arms are positioned in alignment with rail 44a. When released, rail 44a will engage in the hooked portion of the related arms to complete the mounting of the scale in slidable relation to the rails 44, 44a.

The stud 41 on arm 40 is then disengaged from the offset of recess 42. Inasmuch as the stud 41 engaging the upper wall of slot 28 holds sleeve 27 and spindle 32 against rotation, the force stored in spring 31 tends to turn shaft 25 and move idler roller 22 away from the driven roller 14 while the engagement of gears 29 on shaft 25 with racks 30 maintains the axis of roller 22 parallel with that of roller 14. Thus, spring 31 in acting to separate rollers 22 and 14 applies a slight tension to the panel of crossing threads, and as a result of the parallel disposition of the rollers, equal tension is applied to the contiguous thread portions.

Simultaneously with the release of roller 22, the crank 18 is turned to drive shaft 13 and rotate roller 14, causing the panel of thread to be moved axially of the rollers. The axial movement of the thread panel is caused by a force which is a resultant of the slight force evenly applied by spring 31 to all the thread portions extending between the rollers and the stress on the thread portions due to their slightly angular position with respect to the axes of the rollers.

As roller 14 is turned it drives the thread loop on the rollers so that the thread panel progresses axially of the rollers as the continuous thread loop feeds back from one end of the panel to the other. Because of the interlacing of the thread portions that extend between the rollers, the thread forms its own guide for spacing those thread portions which extend partially about the rollers evenly along each roller and for disposing those portions which extend between the rollers in parallel relation to each other. The interlacing of the thread also causes the thread portions extending between the rollers to exert a slight force on each other axially of the rollers which, in addition to assisting axial movement of the panel, results in positioning these thread portions closely adjacent each other at their line of intersection where they are supported by the longitudinal edge of the scale arm 46 of measuring member 45.

The axial movement of the thread panel, due to the arrangement of the thread loop on the rollers and the rotation of the latter, together with the slight tension exerted on the thread panel by the spring 31 acting to separate the rollers and take up any slack in the loop, thus causes the thread portions forming the panel to readjust their positions and line up in orderly fashion in compact contiguous relation to form a panel of a certain width. Once the thread portions forming the panel have been readjusted so that the tension applied to the thread balances the axial contracting force, the width of the thread panel does not change although rotation of the rollers may be continued.

In their readjusted positions all of the adjacent portions of the thread panel are under equal but slight tension which is evenly applied thereto by the force of spring 31 acting to separate the parallelly disposed rollers. Further, the compressive forces applied diametrally to various thread positions are very slight and equal on all thread portions. Therefore, inasmuch as the portions of the thread loop are evenly lined up, are under equal slight tension and the diametral compressing forces are also equal and small, the width of the panel may be measured by reference to the graduations of the scale and divided by the number of interlaced portions at their point of intersection (or, in other words, by twice the number of thread turns on either roller) to determine the thickness of the thread.

When testing thread of various diameters, if a constant force is applied by the roller 22 and a uniform length of thread employed in each instance, so that the same number of turns are formed on the rollers in each case, the scales may be graduated so that the thread thickness may be read directly, thus obviating the necessity of mathematical division. If desired, the readjusted thread panel may be displaced axially of the rollers to align one edge of the thread panel with the zero graduation of the scale by rotating roller 14 in the proper direction to move the panel in the desired direction. In this way the other edge of the panel may be brought into alignment with the scale graduation indicating the width of the panel, or thickness of the thread.

Where the spring 31 is arranged to apply a constant and uniform contracting force when testing like lengths of various threads, the width of the panel formed on the rollers is directly proportional to the physical thickness of the various threads tested.

Spring 31 may readily be adjusted to apply a desired constant contracting force to a thread panel on the rollers. Rollers 14 and 22 are interchanged so that roller 14 becomes connected to shaft 25 and idler roller 22 is mounted in the bore of shaft 13. With the device in a horizontal position, a cord or thread is fastened to roller 14, led over roller 22 and a weight corresponding to the desired force is attached to the free end of the thread so that it tends to turn roller 14 and shaft 25 clockwise. By inserting a suitable key through sleeve 27 into engagement with the notched end of spindle 32 the latter may be moved axially against the force of spring 33 to disconnect the pin 36 on spindle 32 from the notch 37 in the hub 38 of sleeve 27, thus freeing spindle 32 for rotation by the key. Spindle 32 then may be turned to wind spring 31 until the force applied by the latter for turning shaft 25 and roller 14 counter-clockwise balances the weight suspended from the thread attached to roller 14.

Although an illustrative embodiment of the invention has been described in detail, there are many changes and variations which may be made without departing from the invention, and it is desired and intended to include all such changes and variations within the scope of the appended claims.

I claim:

1. The method of arranging thread to form a thread panel having a width measurable to determine the thickness of the thread which comprises, winding and supporting a length of thread in a number of successive figure eight turns so that a number of thread portions are interlaced with each other, applying slight tension to the interlaced portions of thread and effecting movement of said thread in a direction axially thereof to cause the tension applied to said thread portions and the interlacing thereof to effect rearrangement of said thread portions in closely positioned parallelly disposed relation.

2. The method of arranging thread to form a thread panel having a width measurable to determine the thickness of the thread which comprises, winding and supporting a length of thread in a number of successive figure eight turns so that a number of thread portions are interlaced with each other, effecting movement of said thread in a direction axially thereof and simultaneously applying slight tension to the interlaced portions thereof to cause rearrangement of said thread portions in closely positioned parallel relation as a result of the interlacing and tensioning of said thread portions.

3. The method of determining the thickness of thread as a function of the width of a thread panel formed of a plurality of contiguous parallelly-extending thread portions which comprises, winding and supporting a continuous loop of thread in a plurality of figure eight turns so that a plurality of thread portions are interlaced with each other, applying slight and equal tension to each of said interlaced thread portions, effecting movement of said loop of thread in a direction axially of the latter for causing the tension applied to said thread portions and the interlacing thereof to effect their rearrangement to form a thread panel comprising closely-positioned parallelly disposed thread portions, and measuring the width of said panel.

4. The method of determining the thickness of thread as a function of the width of a thread panel formed of a plurality of contiguous parallelly-extending thread portions which comprises, cutting a length of thread, tieing the ends of said length to form a continuous loop, winding and supporting said thread loop in a plurality of consecutive figure eight turns so that portions of said thread loop are interlaced, applying tension to said interlaced thread portions, effecting movement of said loop in the direction of the thread axis for causing the tension applied to said thread portions and the interlacing thereof to effect rearrangement of said thread portions to form a thread panel comprising closely-positioned parallelly-extending thread portions, and measuring the width of said panel.

5. Apparatus for arranging thread or the like to determine the thickness thereof comprising, a pair of members mounted in spaced relation to support a length of thread distributed thereon with a plurality of thread portions extending between said members; means acting to apply slight tension to the thread on said members; and means for operating one of said members for effecting displacement of said thread portions in the direction of their axes to rearrange said thread portions on said members to form a thread panel comprising closely positioned parallel thread portions.

6. Apparatus for arranging thread or the like to determine the thickness thereof comprising; a pair of members mounted in spaced relation to support a length of thread distributed thereon with a plurality of thread portions extending between said members; means acting to move said members apart and apply slight tension to the thread thereon; means for operating one of said members to effect displacement of said thread portions in the direction of their axes and acting in conjunction with said moving means to rearrange said thread portions on said members to form a thread panel comprising closely positioned parallel thread portions; and means extending parallel to said members for measuring the width of said panel.

7. Apparatus for arranging thread or the like to determine the thickness thereof comprising; a pair of spaced members adapted to support a length of thread distributed thereon with a plurality of portions of said thread extending between said members; means for applying force to one of said members to move it away from the other member; means for maintaining said moved member parallel with the other member during said movement to apply equal tensioning forces to said portions of thread; and means for operating one of said members during the separation thereof for effecting displacement of said thread portions in the direction of their axes and to cause rearrangement the thread on said members to form a thread panel comprising equally tensioned closely-positioned thread portions extending parallelly between said members.

8. Apparatus for arranging thread to determine the thickness thereof comprising; a pair of parallelly-mounted members adapted to support a length of thread disposed in a plurality of consecutive figure eight turns with portions thereof extending in interlaced relation between said members; means acting to separate said members and apply slight tension to the thread thereon; means for maintaining said members disposed in parallel relation during the separation thereof to equalize the tension applied to said thread portions; and means for operating one of said members to effect relative displacement of said thread portions in the direction of their axes and acting in conjunction with said tensioning means to rearrange said thread portions axially of said members.

9. Apparatus for arranging thread to determine the thickness thereof comprising; a pair of parallelly-mounted members adapted to support a continuous loop of thread disposed thereon in a plurality of successive figure eight turns with portions thereof extending in interlaced relation between said members; means acting to separate said members and apply slight tension to the thread thereon; means for maintaining said members disposed in parallel relation during the separation thereof to equalize the tension applied to said thread portions; and means for operating one of said members for effecting relative displacement of said thread portions in the direction of their axes and acting to move said thread portions axially of said members for forming a thread panel of equally tensioned closely positioned parallelly-extending thread portions.

10. Apparatus for arranging thread or the like to determine the thickness thereof comprising; a support; a pair of spaced rollers adapted to have a length of thread distributed thereon with a plurality of thread portions extending between said rollers, one of said rollers being journalled in said support and the second being mounted on said support for movement away from said first roller; means acting on said second roller to move it along said support away from said first roller, said means applying slight tension to the thread distributed on said rollers; and means for maintaining the axis of said second roller parallel with that of said first roller during said movement thereof to cause said moving means to apply equal tension to each of the thread portions extending between said members.

11. Apparatus for arranging thread or the like to determine the thickness thereof comprising; a support; a pair of spaced rollers adapted to have a length of thread distributed thereon in a plurality of figure eight turns with a plurality of thread portions extending in interlaced relation between said rollers, one of said rollers being journalled in said support and the second being mounted on said support for movement away from said first roller; means acting on said second roller to move it along said support away from said first roller, said means applying slight tension to the thread distributed on said rollers; means for maintaining said second roller parallel with said first roller during said movement thereof to cause said moving means to apply equal tension to each of the thread portions extending between said members; and means for rotating said first roller acting in conjunction with said roller moving and thread tensioning means to cause movement of said thread portions axially of said roller to form a compact thread panel.

12. Apparatus for arranging thread or the like to determine the thickness thereof comprising; a support; a pair of spaced rollers adapted to have a length of thread distributed thereon with a plurality of thread portions extending in interlaced relation between said rollers, one of said rollers being journalled in said support and the second being mounted on said support for movement away from said first roller; means acting on said second roller to move it along said support away from said first roller, said means applying slight tension to the thread distributed on said rollers; means for maintaining said second roller parallel with said first roller during said movement thereof to cause said moving means to apply equal tension to each of said thread portions; and means for rotating said first roller acting in conjunction with said roller moving and thread tensioning means to cause the interlaced relation of said thread portions to effect movement thereof axially of said rollers to arrange said thread portions in a panel formed of closely positioned equally tensioned thread portions extending in parallel relation between said rollers.

13. Apparatus for arranging thread or the like to determine the thickness thereof comprising; a support; a pair of spaced rollers adapted to have a length of thread distributed thereon with a plurality of thread portions extending between said rollers, one of said rollers being journalled in said support and the second being mounted on said support for movement away from said first roller; means acting on said second roller to move it along said support away from said first roller, said means applying slight tension to the thread distributed on said rollers; means for maintaining said second roller parallel with said first roller during said movement thereof to cause said moving means to apply equal tension to each of the thread portions extending between said members; means for rotating said first roller acting in conjunction with said roller moving and thread tensioning means to cause movement of said thread portions axially of said roller for rearranging said thread portions in closely positioned parallel relation between said rollers to form a compact thread panel; and means disposed parallel to said rollers for measuring the axial extent or width of said panel along said rollers.

14. Apparatus for arranging thread or the like to determine the thickness thereof comprising; a support; a pair of spaced rollers adapted to have a length of thread distributed thereon with a plurality of thread portions extending between said rollers, one of said rollers being journalled in said support and the second being mounted on said support for movement away from said first roller; and rack and pinion mechanism associated with said second roller for maintaining it parallel to said first roller during said movement.

15. Apparatus for arranging thread or the like to determine the thickness thereof comprising; a support; a pair of spaced rollers adapted to have a length of thread distributed thereon with a plurality of thread portions extending between said rollers, one of said rollers being journalled in said support and the second being movable along said support away from said first roller; a shaft for supporting said second roller; means for guiding said shaft to maintain said second roller parallel to said first roller; and means for rotating said shaft to move it laterally of said support along said guide means.

16. Apparatus for arranging thread or the like to determine the thickness thereof comprising; a support; a pair of spaced rollers adapted to have a length of thread distributed thereon with a plurality of thread portions extending between said rollers, one of said rollers being journalled in said support and the second being mounted on said support for movement away from said first roller; spring means associated with said second roller for moving it away from said first roller and acting to apply slight tension to the thread portions extending between said rollers; means for maintaining said second roller parallel to said first roller during said movement to apply equal tension to said thread portions; and means for rotating said first roller to cause realignment of said thread portions to dispose them in closely positioned parallel relation axially of said rollers.

17. Apparatus for arranging thread or the like to determine the thickness thereof comprising; a pair of members mounted in spaced relation to support a length of thread distributed thereon with a plurality of thread portions extending between said members; a thread supporting and measuring member having a base and a plurality of measuring arms extending centrally from said base with their longitudinal edges positioned at different heights with respect to the center of said base; and cooperating means on said base and support for mounting said member on said support between said rollers in any one of a plurality of rotative positions with respect to said support to selectively dispose the longitudinal edges of said arms parallel to said rollers for supporting thread portions extending between said rollers at different levels with respect to the common plane of the axes of said rollers.

18. Apparatus for arranging thread or the like to determine the thickness thereof comprising; a pair of members mounted in spaced relation to support a length of thread distributed thereon with a plurality of thread portions extending between said members; means acting to move said members apart; a thread supporting and measuring member having a base and a plurality of measuring arms extending centrally from said base with their longitudinal edges positioned at different heights with respect to the center of said base; and cooperating means on said base and support for slidably mounting said member on said support between said rollers in any one of a plurality of rotative positions with respect to said support to selectively dispose the longitudinal edges of said arms for movement parallel to said rollers for supporting thread portions extending between said rollers at different levels with respect to the common plane of the axes of said rollers.

HANS P. LUHN.